United States Patent Office 3,280,054
Patented Oct. 18, 1966

3,280,054
CURABLE SYSTEMS CONTAINING ADDUCTS OF VARYING RATIOS OF POLYAMINOAMIDES AND EPOXY RESINS
Wolfgang Gotze, Bergkamen, and Walter Gugel and Horst Krase, Kamen, Germany, assignors to General Mills, Inc., a corporation of Delaware
No Drawing. Filed Sept. 8, 1964, Ser. No. 395,025
Claims priority, application Germany, Sept. 19, 1963, Sch 33,884
12 Claims. (Cl. 260—18)

This invention relates to a process of curing epoxy resins and to a hardenable resin mixture employed therein. In particular, the invention relates to the curing of epoxy resins by reacting two thermoplastic adduct components, one component having free amine groups and the other component having free epoxy groups, both components being the thermoplastic reaction product of a solid epoxy resin and a polymeric fat acid polyamide of an alkylene diamine.

Coating and painting materials utilizing thermoplastic resins as binders which are dry and non-adhesive or non-tacky after evaporation of the solvent have been known. Such materials, however, generally have insufficient mechanical or physical properties and stability. To improve the physical properties and stability, attempts have been made to use a two component thermosetting system as a binder for coating and paint materials. Such, however, are susceptible to exterior influences for a long period after evaporation of the solvent as considerable time must elapse to provide a non-tacky and dry surface. This results in long waiting periods before further processing of the product can be conducted, and protective measures are required for the freshly applied film to protect against soiling and weather influences. The disadvantages of this type of system are particularly apparent where binders for printing inks in rotary printing are concerned. In this application an immediate rolling up of the printed product requires complete non-tackiness of the printing dye or ink.

A hardenable resin mixture has now been found which does not exhibit the above mentioned disadvantages and is composed of two thermoplastic adduct components, one having free amine groups, the other having free epoxy groups, both adduct components being thermoplastic, soluble in the usual conventional solvents and which, upon reaction, harden or cure to an infusible, insoluble product. These components are adducts of a solid epoxy resin and a solid polymeric fat acid polyamide of an alkylene diamine. Using these adduct components, the components are compatible and clear films are obtained. The coats of paint or print present a good appearance. If the solid polyaminoamides are used for curing the epoxy resins without the prior production of the mutual adducts, incompatibility results after evaporation of the solvent presenting a milky appearance in the coating and further hardening being unsatisfactory. Similar results occur if only one adduct of the polyaminoamide and excess of epoxy resin is employed to cure or harden an epoxy resin.

Films and paint coats made of solutions of the hardenable resin mixtures of the present invention are not tacky at room temperature after about 15 minutes. When heat is applied, as customary in printing, the drying time is shortened correspondingly and depends primarily on the speed with which the solvent evaporates. The use of solutions of the resin mixture finds the main fields of utility as binders for paints, printing colors and adhesives for lining sheets of all kinds and paper. The resin mixtures of the present invention can also be processed without the use of solvents. Since the resin components are present in solid form, a mixture of powderized resins can be used as spin sintering and flame spraying materials. The premixed powder has unlimited storage stability at room temperature but will cure rapidly at elevated temperatures.

The epoxy resins which may be employed in this invention are solid epoxy resins. A wide variety of such resins are available. The typical commercially available resins are complex reaction products of polyhydric phenols with polyfunctional halohydrins. A large number of this type of epoxy resins are disclosed in Greenlee Patents 2,585,-115 and 2,589,245. Typical polyhydric phenols useful in the preparation of the epoxy resins include resorcinol and various bisphenols resulting from the condensation of phenol with aldehydes and ketones, such as formaldehyde, acetaldehyde, methyl ethyl ketone and the like. A typical epoxy resin is the reaction product of epichlorohydrin and 2,2-bis (p-hydroxy phenyl) propane (Bisphenol A), the resin having the following theoretical structural formula:

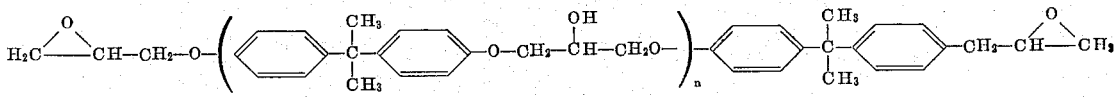

where $n$ is an integer up to 10. Generally speaking, $n$ will be no greater than 2 or 3 or generally in excess of 1. The resins may be characterized by reference to their epoxy equivalent weight, the epoxy equivalent weight of pure epoxy resins being the mean molecular weights of the resin divided by the number of epoxy radicals per molecule, or in any case the number of grams of one gram equivalent of epoxide. In general, those epoxy resins of bisphenol A having an epoxy equivalent weight above 300 are solid in form. The preferred resins for use in this invention are those having epoxy equivalent weight of 400 or more.

Other epoxy resins which may be employed are the epoxidized novolac resins which are well known and readily available commercially. These resins may be represented by the following theoretical idealized formula:

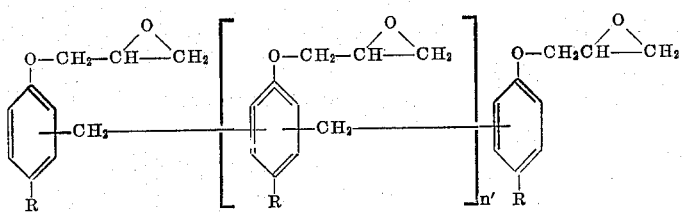

where R is selected from the group consisting of hydrogen and alkyl groups having up to 18 carbon atoms and $n'$ is an integer from 1–5. In general, $n'$ will be an integer in excess of 1 to about 3. These resins are obtained by epoxidation of the well known novolac resins, in the well known manner by adding the novolac resin to epichlorohydrin and adding an alkali metal hydroxide to the mixture so as to effect the desired condensation reaction. The novolac resins which are epoxidized are prepared in the known manner by condensing a phenol with an aldehyde in the presence of an acid catalyst. Although resins from formaldehyde are generally employed, resins from other aldehydes such as acetaldehyde, chloral, butyraldehyde, furfural, and the like may also be used. The alkyl group, if present, may be straight or branched chain. Illustrative of the alkyl phenol from which the novolac resins may be derived are cresol, butylphenol, tertiary butylphenol, tertiary amylphenol, hexylphenol, 2-ethylhexylphenol, nonylphenol, decylphenol, dodecylphenol and the like. While it is generally preferred to have the alkyl group attached in the para position, novolac resins with the alkyl group in the ortho position have been prepared.

The polyaminoamides employed in the present invention are the polymeric fat acid polyamides of an alkylene diamine. The polyaminoamide has an amine number of from 30–70 and preferably between 50–60. As used herein, the "amine number" of the resin is the number of milligrams of KOH equivalent to the free amine groups in one group of the resin.

The alkylene diamine employed is one in which the alkylene group contains from 2 to 6 carbon atoms. Typical of these alkylene diamines are ethylene diamine, 1,3-diaminopropane, 1,3-diaminobutane, 1,4-diaminobutane, hexamethylene diamine, 3-isopropylamino propylamine and the like.

The polymeric fat acids are a mixture of dimeric and trimeric fatty acids resulting from the polymerization of drying or semi-drying oils or from the polymerization of the free acids or simple aliphatic alcohol esters of the acids of such oils as soybean, linseed, tung, perilla, oiticica, cottonseed, corn, tall, sunflower, safflower and dehydrated castor oils. These may be polymerized by a simple thermal polymerization in which case the fatty acids of sufficient double bond functionality combine to provide a mixture of dibasic and higher polymeric acids. The acids with insufficient functionality to react remain as monomers and may be removed by distillation. Inasmuch as some monomeric fatty acid may be desirable to control molecular weight as was indicated above, the amount of monomer left in the polymeric fat acids may be regulated for this purpose. In place of thermal polymerization for the production of the polymeric fat acids, a catalytic method of polymerization such as, for example, the polymerization of mono or poly olefinic acids in the presence of such catalysts as ditertiary butyl peroxide may be employed. The resultant polymeric fat acids may retain residual unsaturation or may be saturated either as a result of the polymerization reaction or through hydrogenation.

The polyamides are prepared by amidification of the polymeric fat acid with the diamine under the usual conditions employed for amidification. Generally this involves reaction at about 150°–250° C. for from 1–5 hours. Usual conditions are about 200° C. for about 2–3 hours. The amine is employed in an amount sufficient to provide the desired amine number in the product.

The individual adduct components are prepared by reacting the polyamide and epoxy resin in the proper amounts either in solid form by fusion or in solution form, in which reaction will occur at room temperature although elevated temperatures may be employed. The usual non-reactive solvents for the two types of resins are employed. Elevated temperatures, if employed, are not critical but generally the solutions are heated under reflux. Any temperature below decomposition temperature of the materials would appear suitable.

As indicated earlier, one adduct component has free amino groups while the second adduct component has free epoxy or oxirane groups. This is achieved by employing an excess of polyaminoamide in forming one adduct while employing a stoichiometric excess of epoxy in forming the second adduct. The total amount of polyaminoamide employed in both adducts should provide a sufficient amount to cure the sum total of epoxy resin in both adducts. This generally involves having substantially equivalent amounts of amine groups and epoxy groups present. By weight, the ratio of polyaminoamide to epoxy resin will be in the ratio of 40:60 to about 70:30, and preferably in the ratio of 60:40 to 50:50. In general about 70–90% by weight of the total required polyaminoamide will be found in the adduct component having free amino groups, the remainder being found in the adduct component having free epoxy groups.

As indicated, in forming the adduct having free amine groups, an excess of the polyaminoamide is employed. By weight, the polyamide will comprise from about 70–90% of the weight of the resin mixture of this adduct. In forming the adduct having free epoxy or oxirane groups, the polyaminoamide will comprise about 10–30% by weight of the resin mixture of this adduct.

The invention can best be illustrated by means of the following examples in which all parts are by weight unless otherwise indicated. In all instances, the polymeric fat acids were derived by the polymerization of tall oil fatty acids.

*Example I*

The following materials were dissolved by stirring in separate vessels at room temperature:

(a)

18 parts of a solid polyaminoamide of polymeric fat acids and ethylene diamine having an amine value of 39.
7 parts of a solid epoxy resin of bisphenol A and epichlorohydrin having an epoxy equivalent weight of about 500.
15 parts Cellosolve.
30 parts toluene.

(b)

18 parts of the solid epoxy resin above.
7 parts of the solid polyaminoamide above.
15 parts Cellosolve.
30 parts toluene.

Both adduct solutions (a) and (b) were refluxed for about 15 minutes and cooled. Upon mixing the adduct solution in a 1:1 ratio, an immediately compatible solution was formed ready for use.

*Example II*

The following adducts were prepared by dissolving the resins in the solvents indicated by stirring in separate vessels at room temperature:

(a)

18 parts of a solid polyaminoamide of the polymeric fat acids from tall oil fatty acids and ethylene diamine having an amine number 51.
7 parts by weight of the same epoxy resin employed in Example I.
15 parts Cellosolve.
30 parts toluene.

(b)

18 parts of the solid epoxy resin of Example I.
7 parts of the solid polyaminoamide above having an amine number of 51.
15 parts Cellosolve.
30 parts toluene.

After standing for 4 days at room temperature, the adduct solutions were mixed in a 1:1 ratio. The components were fully compatible and provided a clear solution.

In the foregoing examples, the thermoplastic polyaminoamides were prepared in the following manner. The charge of materials may be calculated using the following formula which will allow for an approximate desired amine value in general practice:

$$AA = \frac{FA \times \left(SV + AmV - \frac{SV \times AmV}{3100}\right)}{AmV - AmVd}$$

where

FA = amount of fatty acid in grams
SV = saponification value of fatty acid
AmV = amine value of the amine
AmVd = desired amine value
AA = amount of amine in grams In practice it is generally necessary to calculate for a higher amine value of the final product. For example, to obtain an amine value of 50–55, it is found necessary to calculate for 65.

The fatty acid and amine are then charged to the reactor. The closed reactor is then heated to 150° C. and held at this temperature for 3 hours, during which time the pressure increases to about 3 atmospheres. The reaction mixture is then cooled to 140° C. and the water of reaction vented. The reactor is again closed and heated to 200–205° C. This temperature is held for about 2 hours during which time the pressure will rise to 3–4 atmospheres. The reaction mixture is then cooled and the water vented. A vacuum is applied and held for 20 minutes at 50 mm. Hg. The reaction product is discharged at 120–130° C.

*Example III*

The following separate solutions were prepared:

(a)

22 parts of a solid, thermoplastic polyaminoamide of the polymeric fat acids from tall oil fatty acids and ethylene diamine prepared as discussed hereinabove and having an amine number of about 52.
3 parts of the same epoxy resin of Example I.
15 parts ethanol (isopropanol or Cellosolve may also be employed in place thereof).
30 parts toluene.

(b)

20 grams of the same epoxy resin employed in adduct (a) above.
5 parts of the polyaminoamide above.
15 parts ethanol.
30 parts toluene.

The adduct solutions are prepared by dissolving at room temperature and allowing to stand for about 24 hours. If shorter times are desired, the resins may be dissolved by heating and refluxing for 20 minutes.

The adduct solutions (a) and (b) above are then mixed in a ratio of 1:1 by weight, providing a total ratio of 54 parts of polyaminoamide to 46 parts of the epoxy resin which is substantially a stoichiometric ratio. A clear compatible solution is provided which is suitable when used in a printing ink. It was also found that mixing the solutions (a) and (b) to provide 60 parts of polyaminoamide to 40 parts epoxy resin based on the weight of resin in the total mixture, there was an increase in adhesion. The use of premixed adduct components as described was compared to merely mixing a solution of the polyaminoamide and a solution of the epoxy resin, without adduct formation, and in amounts to provide the same total amounts of polyaminomaide and epoxy resin. Upon mixing the two solutions and applying a film, the individual resins were not compatible.

Combinations of the two adduct solutions (a) and (b), representing both the 54:46 and the 60:40 ratios by weight of polyamide to epoxy resin, were applied as 1.5 mil wet films to both glass and steel plates. The coated films and the bulk mixtures were examined and tested as outlined below for the 54:46 blend.

| | |
|---|---|
| Pot Life _____days__ | 6 |
| Color, Gardner _____ | 8 |
| Initial Viscosity, Gardner-Holdt _____ | A2 |
| Tack-free to foil dry-time _____minutes__ | 2½ |
| Sward Hardness, 1 day cure _____ | 46 |
| Sward Hardness, 7 days' cure _____ | 48 |
| Impact Extensibility, 1 day cure _____percent__ | 1 |
| Impact Extensibility, 9 days' cure _____percent__ | 10–20 |
| Immersion Tests [1]—24 hours, 7 days' cure: | |
|   20% NaOH _____ | H |
|   37% $H_2SO_4$ _____ | S |
|   Water _____ | SS |
|   Mineral Spirits _____ | SS |

[1] H=hard, S=soft, SS=slightly soft.

When the 60:40 blend was tested, it was found to exhibit greater extensibility (>60% after 9 days) and slightly lower hardness (Sward 39 after 7 days), but was very similar to the 54:46 blend in other characteristics.

*Example IV*

The following is another illustration of a desirable formulation:

(a)

27 grams of the polyaminoamide of Example III.
3 grams of the solid epoxy resin of Example III.
18 grams ethanol.
36 grams toluene.

(b)

17 grams of the solid epoxy resin in (a) above.
3 grams of the polyaminoamide in (a) above.
12 grams ethanol.
24 grams toluene.

With these solutions, the most desirable results are obtained by mixing in a ratio by weight of 3 parts of solution (a) and 2 parts of solution (b). The viscosities of the individual adduct solutions do not change even after storing for several weeks. After boiling the individual solutions for 60 hours, the individual solutions still had workable viscosities. In both instances, reactivity during curing was maintained.

The embodiments of the invention in which an exclusive property or privilege is claimed are defined as follows:

1. In a process of curing solid epoxy resins with a solid polyaminoamide of a polymeric fat acid and an alkylene diamine, the improvement consisting of forming two individual adduct components A and B of said epoxy resin and said polyaminoamide, adduct component A having free amine groups and being the adduct of said epoxy resin and an excess of said polyaminoamide, adduct component B having free epoxy groups and being the adduct of said polyaminoamide and an excess of said epoxy resin; and subsequently reacting said adduct components A and B in a ratio so that the total polyaminoamide and epoxy resin are present in an amount sufficient to cure, said epoxy resin being a glycidyl polyether of a polyhydric phenol.

2. A process as defined in claim 1 in which said alkylene diamine is ethylene diamine.

3. A process as defined in claim 1 in which said polyaminoamide has an amine number of from 30 to 70.

4. A process as defined in claim 1 in which said epoxy resin has an epoxy equivalent weight in excess of about 400.

5. A process as defined in claim 1 in which adduct component A is the adduct of 70–90 parts by weight of said polyaminoamide with 10–30 parts by weight of said epoxy resin and adduct component B is the reaction product of 70–90 parts by weight of said epoxy resin with 10–30 parts by weight of said polyaminoamide.

6. A process as defined in claim 1 in which the ratio by weight of polyaminoamide to epoxy resin present in the total resin mixture is from 70:30 to 40:60.

7. A hardenable resin mixture stable at room temperature, consisting essentially of a mixture of two individual powdered adduct components A and B, adduct component A having free amine groups and being the adduct of a solid epoxy resin and an excess of a solid polyaminoamide of a polymeric fat acid and an alkylene diamine, adduct component B having free epoxy groups and being the adduct of a solid polyaminoamide of a polymeric fat acid and an alkylene diamine and an excess of a solid epoxy resin, the polyaminoamide and epoxy resin in the total reaction mixture being present in a hardening amount, said epoxy resin being a glycidyl polyether of a polyhydric phenol.

8. A product as defined in claim 7 in which said alkylene diamine is ethylene diamine.

9. A product as defined in claim 7 in which said polyaminoamide has an amine number of from 30 to 70.

10. A product as defined in claim 7 in which said epoxy resin has an epoxy equivalent weight in excess of about 400.

11. A product as defined in claim 7 in which adduct component A is an adduct of 70–90 parts by weight of said polyaminoamide and 10–30 parts by weight of said epoxy resin, and adduct component B is an adduct of 70–90 parts of said epoxy resin and 10–30 parts by weight of said polyaminoamide.

12. A product as defined in claim 7 in which the ratio of polyaminoamide to epoxy resin present in the total resin mixture is from 70:30 to 40:60 by weight.

References Cited by the Examiner
UNITED STATES PATENTS
2,705,223   3/1955   Renfrew et al. _____ 260—18

LEON J. BERCOVITZ, *Primary Examiner.*

C. W. IVY, *Assistant Examiner.*